United States Patent
Amano et al.

(10) Patent No.: US 9,729,768 B2
(45) Date of Patent: Aug. 8, 2017

(54) ELECTRONIC DEVICE

(71) Applicant: Panasonic Intellectual Property Management Co., Ltd., Osaka (JP)

(72) Inventors: Takuya Amano, Osaka (JP); Miyuki Nagashima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/817,282

(22) Filed: Aug. 4, 2015

(65) Prior Publication Data

US 2015/0341530 A1 Nov. 26, 2015

Related U.S. Application Data

(63) Continuation of application No. PCT/JP2013/003641, filed on Jun. 11, 2013.

(30) Foreign Application Priority Data

Feb. 5, 2013 (JP) .................................. 2013-020150

(51) Int. Cl.
*H04N 5/225* (2006.01)
*H04N 5/232* (2006.01)
(Continued)

(52) U.S. Cl.
CPC ........... *H04N 5/2252* (2013.01); *G03B 17/02* (2013.01); *H04N 5/2254* (2013.01);
(Continued)

(58) Field of Classification Search
CPC .. H04N 5/2251; H04N 5/2252; H04N 5/2254; H04N 5/23293; G03B 17/00;
(Continued)

(56) References Cited

U.S. PATENT DOCUMENTS

| 9,019,692 B2 * | 4/2015 | Tomimoto | ............... H05K 7/00 361/679.01 |
| 2002/0041764 A1 * | 4/2002 | Tanaka | ................... G03B 17/02 396/535 |

(Continued)

FOREIGN PATENT DOCUMENTS

| JP | 11-032411 | 2/1999 |
| JP | 2006-086220 | 3/2006 |

(Continued)

OTHER PUBLICATIONS

International Search Report issued Jul. 9, 2013 in International (PCT) Application No. PCT/JP2013/003641.

*Primary Examiner* — Pritham Prabhakher
(74) *Attorney, Agent, or Firm* — Wenderoth, Lind & Ponack, L.L.P.

(57) ABSTRACT

An electronic device includes an electronic member, a plate having a fastening part, the fastening part having a tubular shape and projecting outward with respect to the electronic member when the plate is arranged outside the electronic member, a case having a hole whose diameter is larger than the outer diameter of the fastening part, the fastening part being inserted into the hole, and a fastening member attached to the fastening part from outside of the case with the fastening part inserted into the hole. A part of the electronic member is located on the axis of the fastening part.

10 Claims, 16 Drawing Sheets

(51) Int. Cl.
  *G03B 17/02* (2006.01)
  *G03B 17/04* (2006.01)
  *G03B 17/12* (2006.01)

(52) U.S. Cl.
  CPC ......... *H04N 5/23293* (2013.01); *G03B 17/04* (2013.01); *G03B 17/12* (2013.01); *G03B 2217/002* (2013.01)

(58) Field of Classification Search
  CPC ........ G03B 17/02; G03B 17/04; G03B 17/12; G03B 2217/002
  USPC ....................................................... 348/374
  See application file for complete search history.

(56) References Cited

U.S. PATENT DOCUMENTS

| | | | | |
|---|---|---|---|---|
| 2005/0057685 A1* | 3/2005 | Yamaguchi | .......... | H04N 5/2252 348/375 |
| 2006/0058078 A1 | 3/2006 | Shiogama | | |
| 2006/0181639 A1* | 8/2006 | Ueda | .................... | H04N 5/2251 348/376 |
| 2007/0268393 A1* | 11/2007 | Hong | .................... | G06F 1/1624 348/333.12 |
| 2011/0019079 A1* | 1/2011 | Saiki | ...................... | G03B 17/02 348/375 |
| 2011/0037893 A1* | 2/2011 | Okada | .................... | G02B 7/021 348/374 |
| 2011/0109790 A1* | 5/2011 | Shinohara | .............. | G03B 17/14 348/373 |
| 2013/0002945 A1* | 1/2013 | Ueda | .................... | H04N 5/2252 348/373 |
| 2013/0051786 A1* | 2/2013 | Matsuzawa | ............ | G03B 17/02 396/535 |
| 2013/0077237 A1* | 3/2013 | Kitajima | .............. | H04N 5/2252 361/679.58 |
| 2013/0163161 A1* | 6/2013 | Tomimoto | ............... | H05K 7/00 361/679.01 |
| 2014/0063265 A1* | 3/2014 | Shukla | .................... | G03B 13/18 348/187 |

FOREIGN PATENT DOCUMENTS

| | | |
|---|---|---|
| JP | 2006-217535 | 8/2006 |
| JP | 2008-193589 | 8/2008 |
| JP | 2010-130080 | 6/2010 |

\* cited by examiner

REGION D

ELECTRONIC DEVICE

TECHNICAL FIELD

The present disclosure relates to an electronic device.

BACKGROUND ART

A conventional electronic device is described, for example, in Unexamined Japanese Patent Publication No. 2006-086220. Unexamined Japanese Patent Publication No. 2006-086220 discloses an electronic device intended to improve the positioning accuracy for a built-in frame when the built-in frame is fixed to a lower cover with a screw.

SUMMARY OF THE INVENTION

Although PTL 1 discloses a technique for improving the positioning accuracy, the technique does not take into consideration effective utilization of an internal space of the electronic device.

Thus, an object of the present disclosure is to provide a technique that enable downsizing of the entire electronic device to be achieved by effectively using an internal space of the electronic device.

An electronic device of the present disclosure includes an electronic member, a plate having a fastening part, the fastening part having a tubular shape and projecting outward with respect to the electronic member when the plate is arranged outside the electronic member, a case having a hole whose diameter is larger than the outer diameter of the fastening part, the fastening part being inserted into the hole, and a fastening member attached to the fastening part from outside of the case with the fastening part inserted into the hole. A part of the electronic member is located on an axis of the fastening part.

Accordingly, the fastening part formed on the plate faces outward with respect to the electronic member. Thus, the electronic member arranged inside the plate is located further closer to the plate. As a result, the downsizing of the entire electronic device is achieved.

DETAILED DESCRIPTION OF INVENTION

Hereinbelow, exemplary embodiments will be described in detail with reference to the drawings in an appropriate manner. However, unnecessarily detailed description may occasionally be omitted. For example, detailed description of already well-known matters and overlapping description of substantially the same configurations may occasionally be omitted. This is to avoid the following description from becoming unnecessarily redundant, and to make it easy for a person skilled in the art to understand the following description.

The inventor(s) provides the accompanying drawings and the following description so that a person skilled in the art can sufficiently understand the present disclosure. Therefore, the accompanying drawings and the following description are not intended to limit the subject matter defined in the claims.

First Exemplary Embodiment

Hereinbelow, a first exemplary embodiment will be described with reference to FIGS. 1 to 16. In the first exemplary embodiment, digital camera 100 will be described as an example.

[1. Appearance Configuration of Digital Camera 100]

Figure 1:
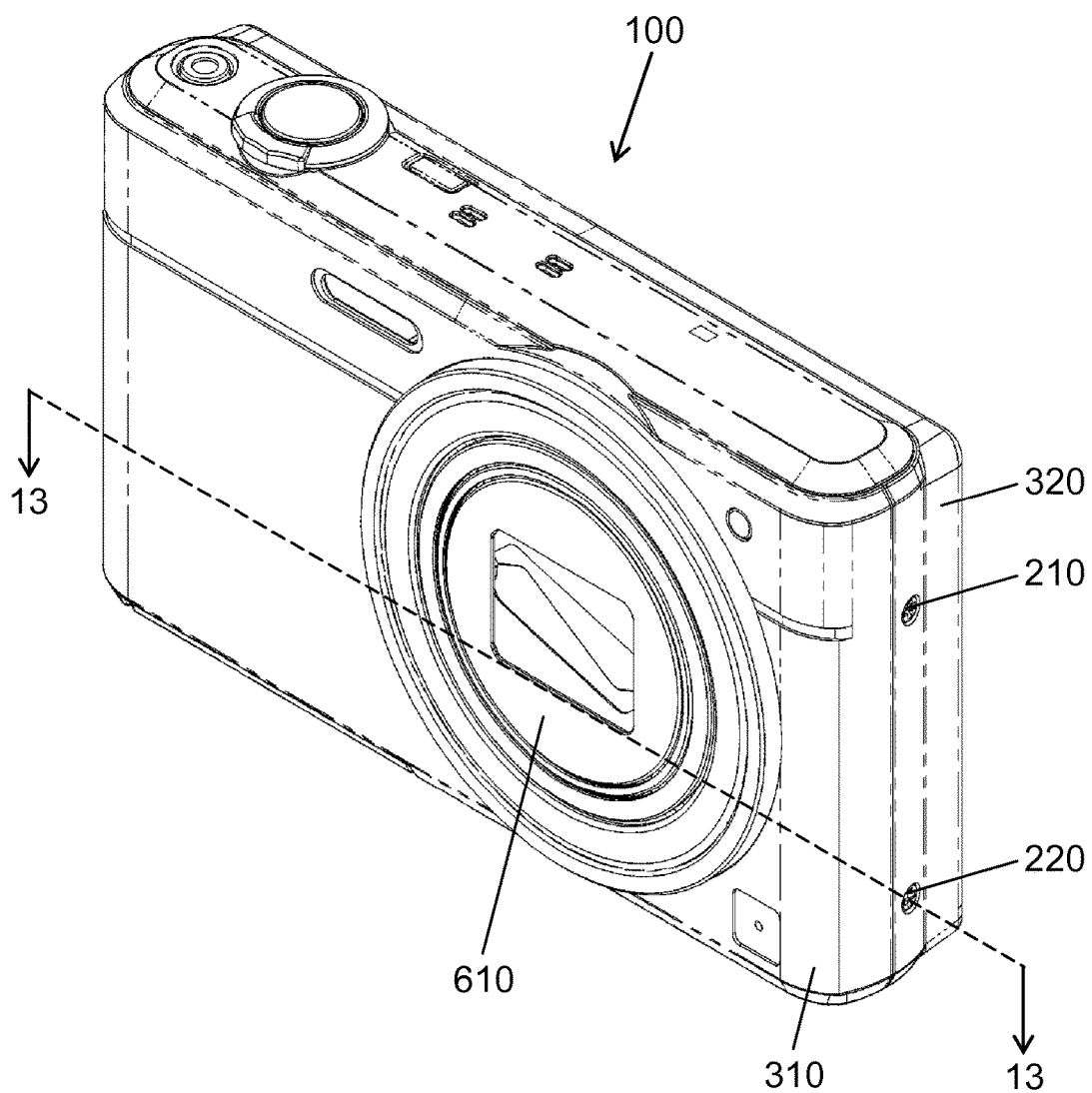
FIG. 1 is a perspective view illustrating a digital camera viewed from a front side oblique direction.
Figure 2:
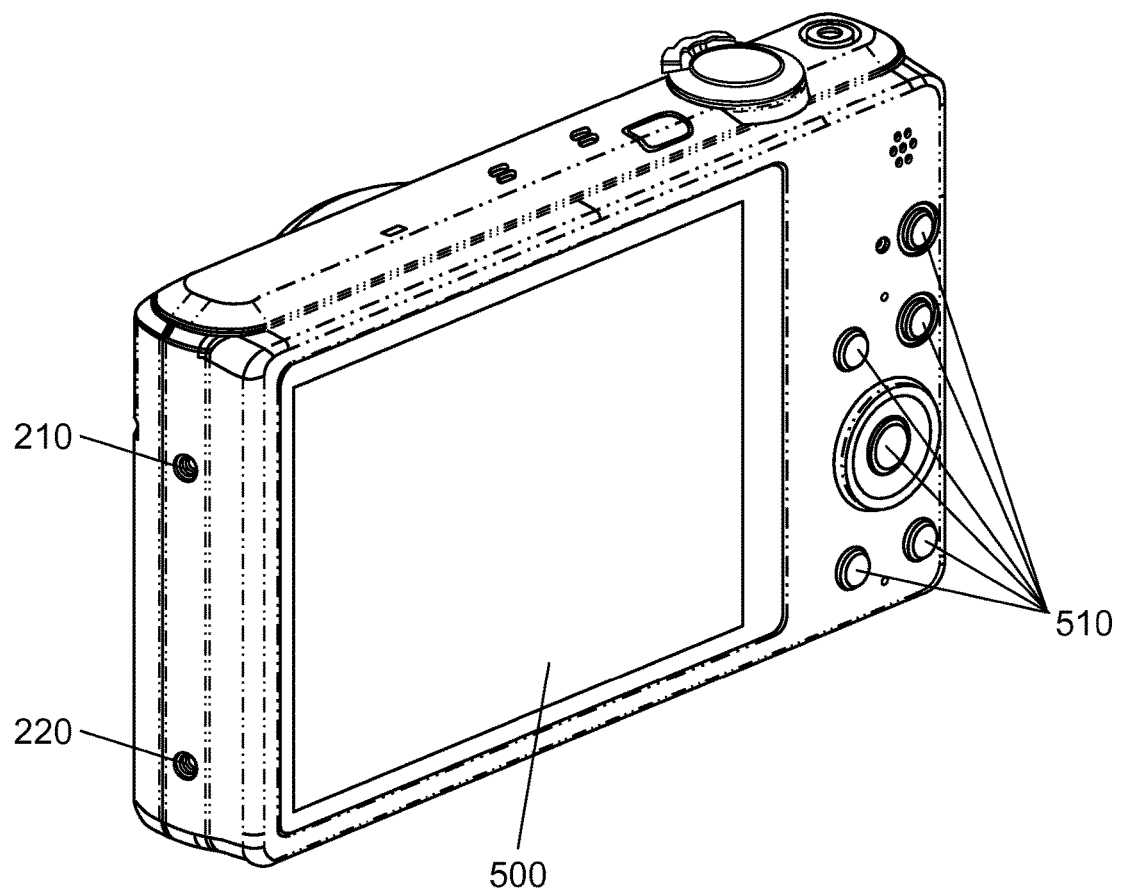
FIG. 2 is a perspective view illustrating the digital camera viewed from a rear side oblique direction.

An appearance configuration of digital camera 100 will be described with reference to FIGS. 1 and 2. FIG. 1 is a perspective view illustrating digital camera 100 viewed from a front side oblique direction. FIG. 2 is a perspective view illustrating digital camera 100 viewed from a rear side oblique direction. A front side of digital camera 100 indicates a side of a subject with respect to digital camera 100. A rear side of digital camera 100 indicates a side of a photographer with respect to digital camera 100.

Digital camera 100 includes lens barrel 610, monitor 500, operation member 510, front case 310, and rear case 320. Lens barrel 610, monitor 500, and operation member 510 are held inside digital camera 100 by front case 310 and rear case 320. One end of front case 310 and one end of rear case 320 are fixed with screw 210 and screw 220. The other end of front case 310 and the other end of rear case 320 are fixed with screws (not illustrated).

Lens barrel 610 is arranged at a position deviated rightward when viewed from the front side of digital camera 100. This is because a space for attaching a lithium ion battery (not illustrated) is provided at a position deviated leftward when viewed from the front side of digital camera 100. Monitor 500 is arranged at a position deviated leftward when viewed from the rear side of digital camera 100. This is because operation member 510 is arranged at a position deviated rightward when viewed from the rear side of digital camera 100.

[2. Internal Configuration of Digital Camera 100]

Figure 3:
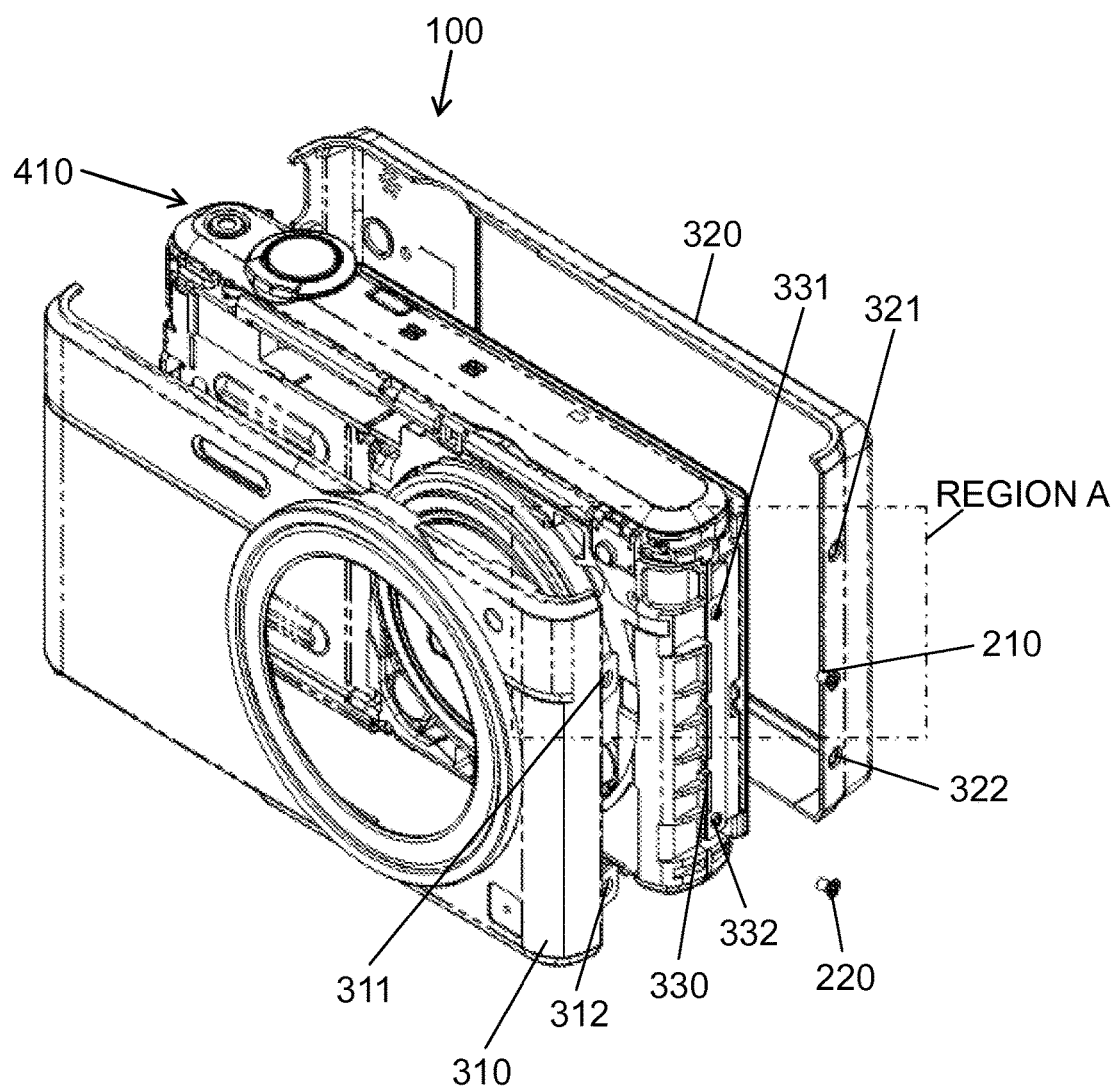
FIG. 3 is an exploded perspective view illustrating the digital camera viewed from the front side oblique direction.
Figure 4:
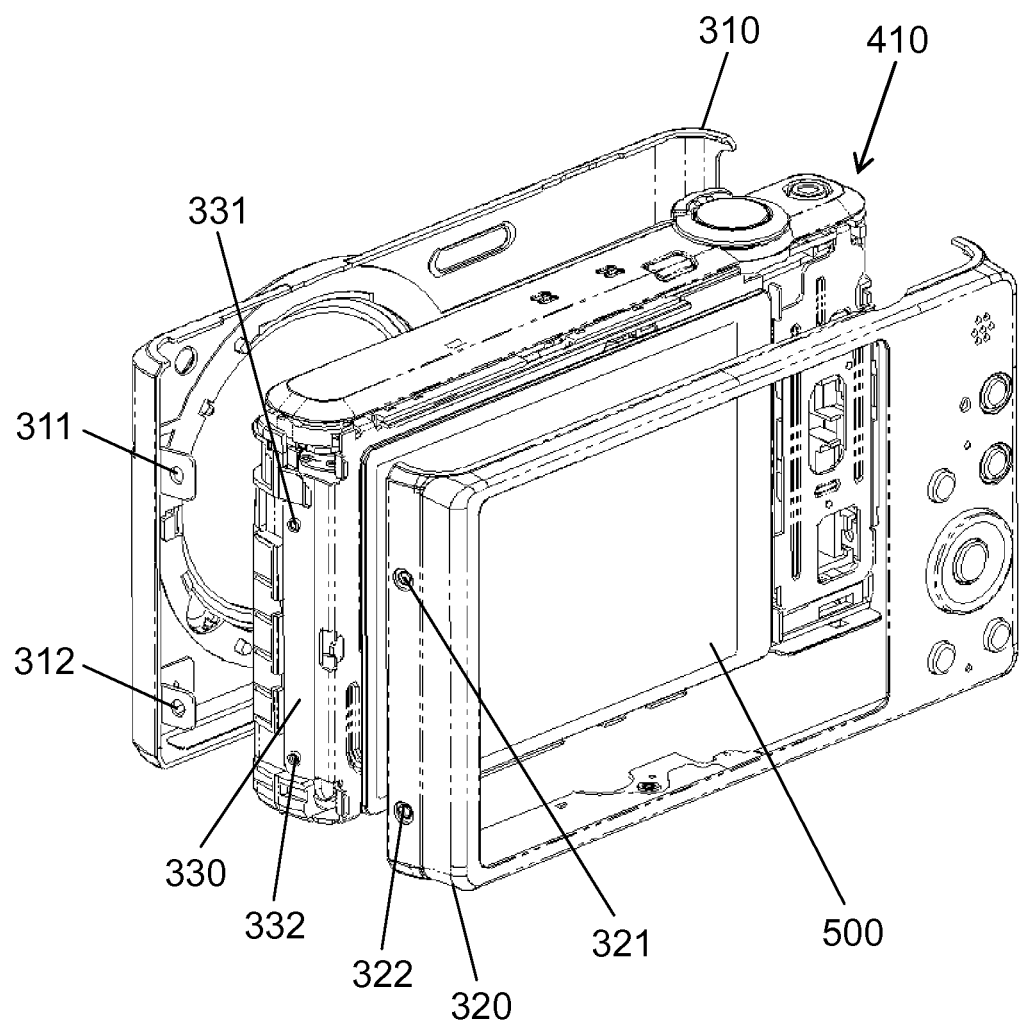
FIG. 4 is an exploded perspective view illustrating the digital camera viewed from the rear side oblique direction.
Figure 5:
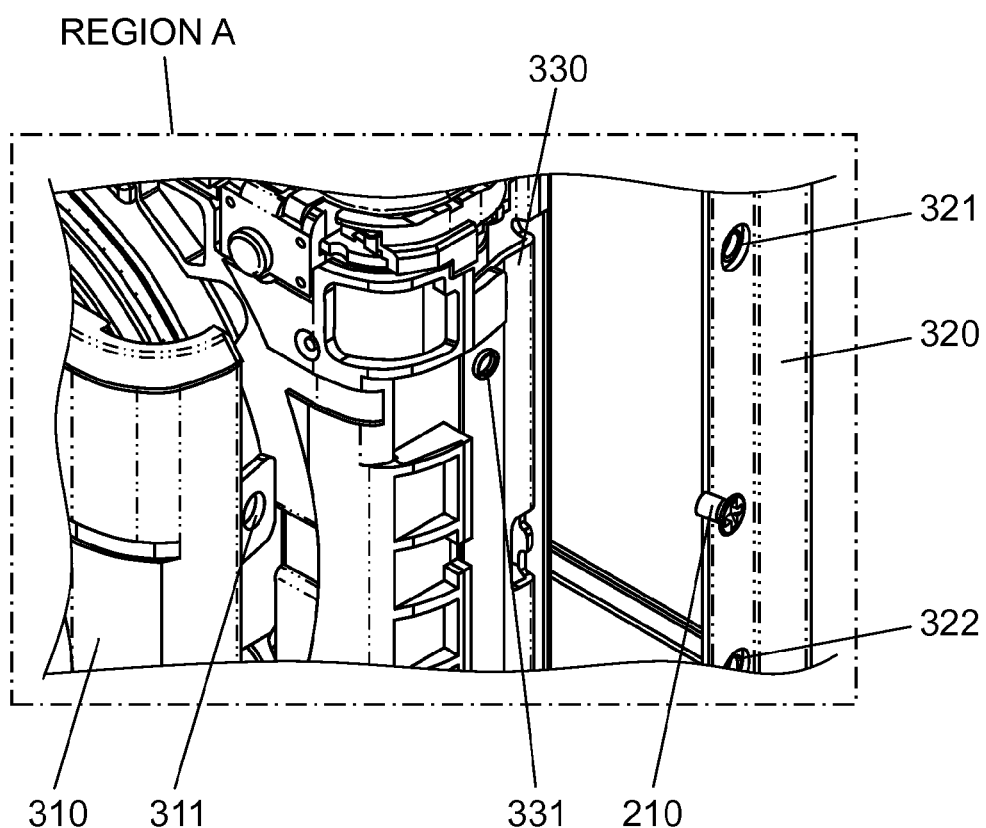
FIG. 5 is a partially enlarged view of region A of FIG. 3.
Figure 6:
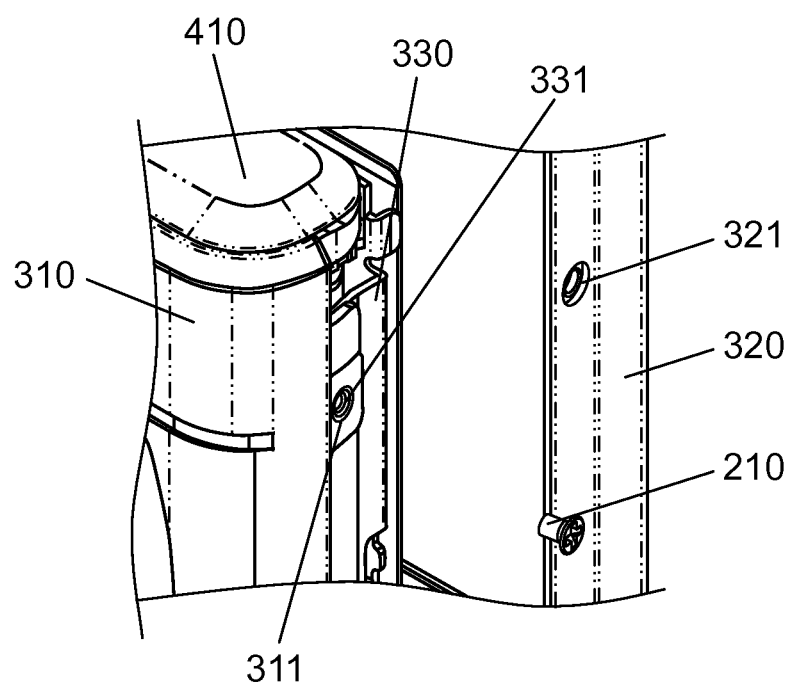
FIG. 6 is a diagram illustrating a front case assembled to a sheet metal of FIG. 5

Configurations of each of the cases (front case 310 and rear case 320), plate 330, and main body component 410 will be described with reference to FIGS. 3 to 6. FIG. 3 is an exploded perspective view illustrating digital camera 100 viewed from the front side oblique direction. FIG. 4 is an exploded perspective view illustrating digital camera 100 viewed from the rear side oblique direction. FIG. 5 is a partially enlarged view of region A of FIG. 3. FIG. 6 is a diagram illustrating front case 310 assembled to plate 330 of FIG. 5.

As illustrated in FIGS. 3 and 4, digital camera 100 can be disassembled into front case 310, main body component 410, plate 330, monitor 500, and rear case 320.

Front case 310 is disposed on the front side of digital camera 100. Front case 310 is made of an aluminum alloy. However, front case 310 may not necessarily be made of such a material. For example, front case 310 may be made of resin. A hole in which lens barrel 610 is to be arranged is formed on front case 310 at a position deviated rightward when viewed from the front side of digital camera 100. Front case 310 has hole part 311 and hole part 312.

Rear case 320 is disposed on the rear side of digital camera 100. Rear case 320 is made of, for example, aluminum or resin. A hole in which monitor 500 is to be arranged is formed on rear case 320 at a position deviated leftward when viewed from the rear side of digital camera 100. Rear case 320 has hole part 321 and hole part 322.

Plate 330 is arranged on the rear side of main body component 410. Plate 330 is made of a tin plate. However, plate 330 may not necessarily be made of such a material. For example, plate 330 may be made of metal such as aluminum or resin. Both ends of plate 330 are bent to cover main body component 410. As illustrated in FIG. 4, plate 330 supports monitor 500. Monitor 500 is supported by plate 330 and thus hardly warped even when pressed by, for example, a photographer from the outside. As a result, monitor 500 hardly breaks. Plate 330 is used for releasing heat generated in an electronic component disposed between front case 310 and rear case 320. Further, plate 330 is used as ground of the electronic component. In addition, plate 330 is also used for improving the rigidity of digital camera 100 as a whole.

As illustrated in FIGS. 3 to 5, burring tap 331 and burring tap 332 which are screw holes are formed on plate 330. The burring tap is an example of a tubular fastening part which projects outward with respect to main body component 410 when plate 330 is arranged outside main body component 410.

A processing method for the burring tap is as follows. First, burring is performed on plate 330 at a target position for forming the burring tap. Burring is a processing method for a material such as a sheet metal. Specifically, first, a hole is formed on a part of a sheet metal. Then, a stick whose outer diameter is larger than an inner diameter of the hole is inserted into the hole. As a result, a flange is formed on the sheet metal. Such a processing method for forming a flange on, for example, a sheet metal is called burring. Then, tapping is performed on an inner side of the projecting part of plate 330 on which burring has been performed to cut a screw thread on the inner side of the projecting part. Accordingly, the burring tap is formed.

As illustrated in FIG. 6, front case 310 is arranged outside plate 330. In this case, burring tap 331 of plate 330 is inserted with clearance into hole part 311 of front case 310. Although not illustrated in FIG. 6, burring tap 332 of plate 330 is inserted with clearance into hole part 312 of front case 310. Burring tap 331 and burring tap 332 may not necessarily be inserted with clearance into hole part 311 and hole part 312. For example, burring tap 331 and burring tap 332 may be inserted without clearance into hole part 311 and hole part 312.

Rear case 320 is arranged outside front case 310. In this case, rear case 320 is arranged in a manner to substantially align an axis of hole part 321 of rear case 320 with an axis of burring tap 331 of plate 330 and to substantially align an axis of hole part 322 of rear case 320 with an axis of burring tap 332 of plate 330. Then, screw 210 and screw 220 are screwed from the outside of rear case 320. That is, front case 310 and rear case 320 are fastened together on plate 330 with screw 210 and screw 220.

Main body component 410 is an example of an electronic member. Plate 330 is an example of a plate. Front case 310 is an example of a case. Screw 210 is an example of a fastening member.

[3. Details of Configurations of Front Case 310 and Plate 330]

Figure 7:
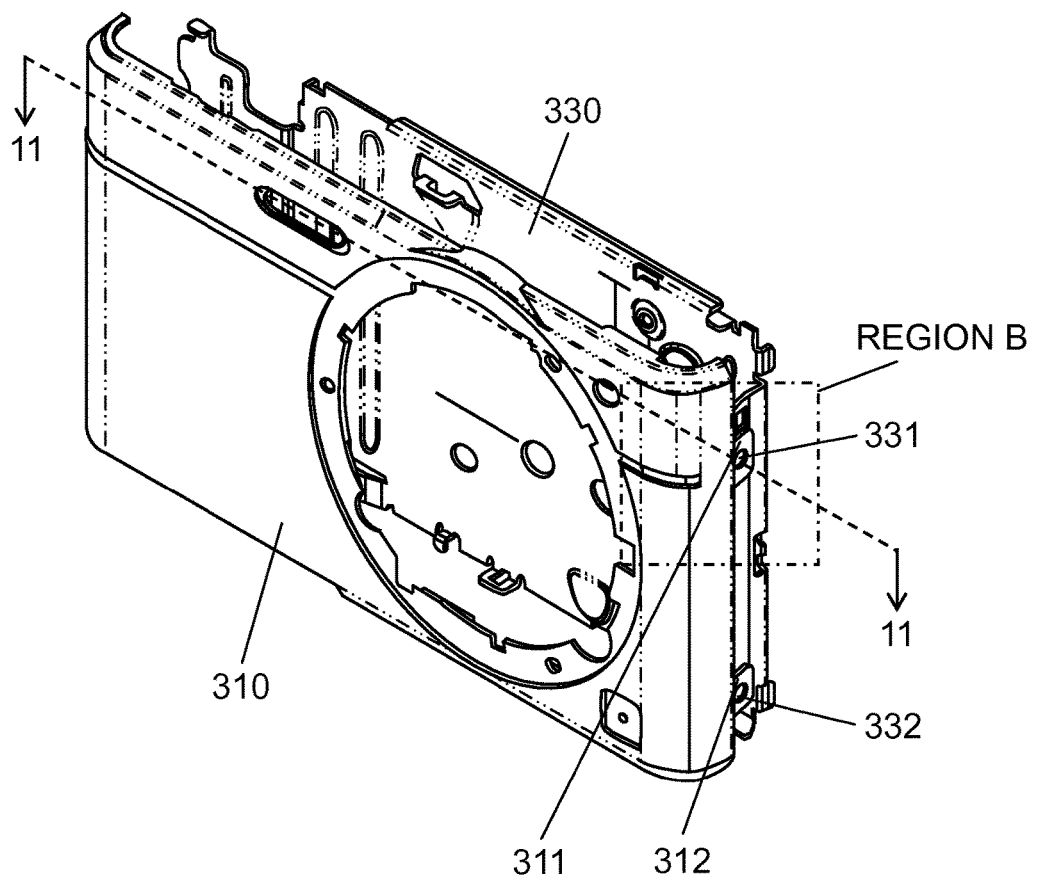
FIG. 7 is a perspective view illustrating a relationship between the front case and the sheet metal.
Figure 8:
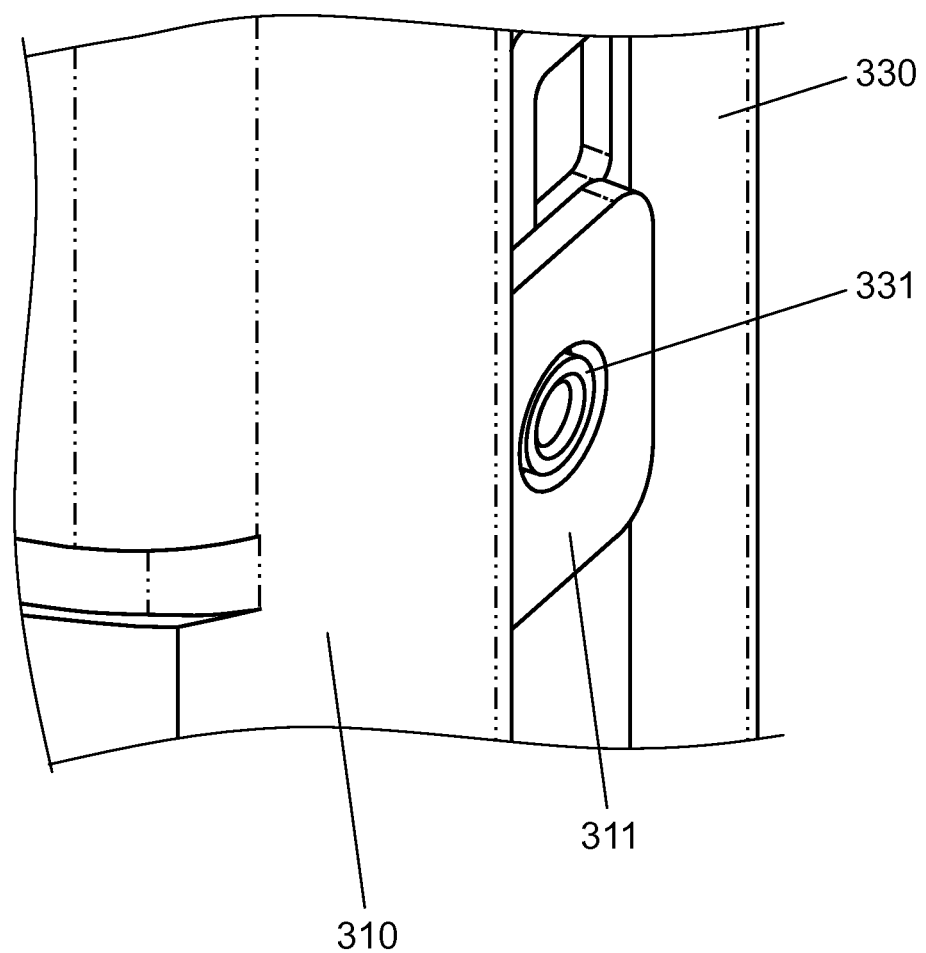
FIG. 8 is a partially enlarged view of region B of FIG. 7.
Figure 9:
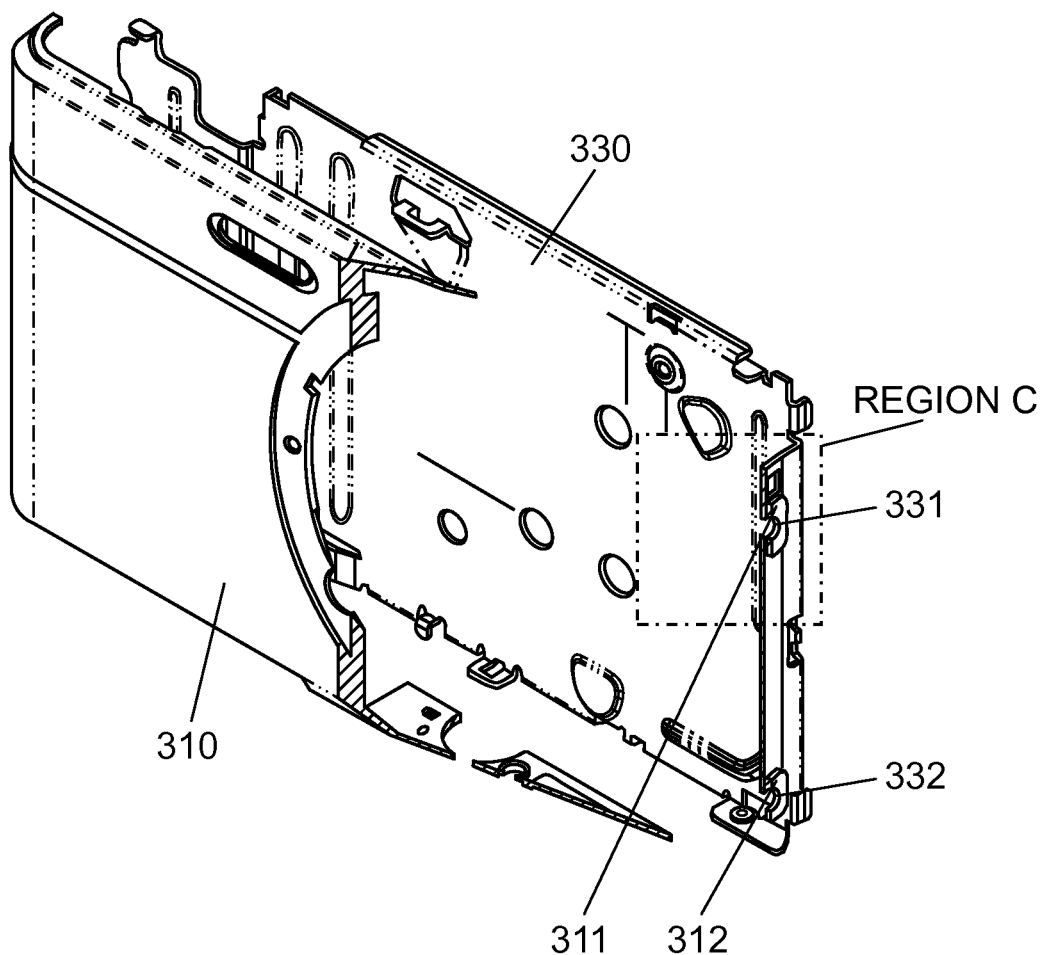
FIG. 9 is a partial sectional view of FIG. 7.
Figure 10:
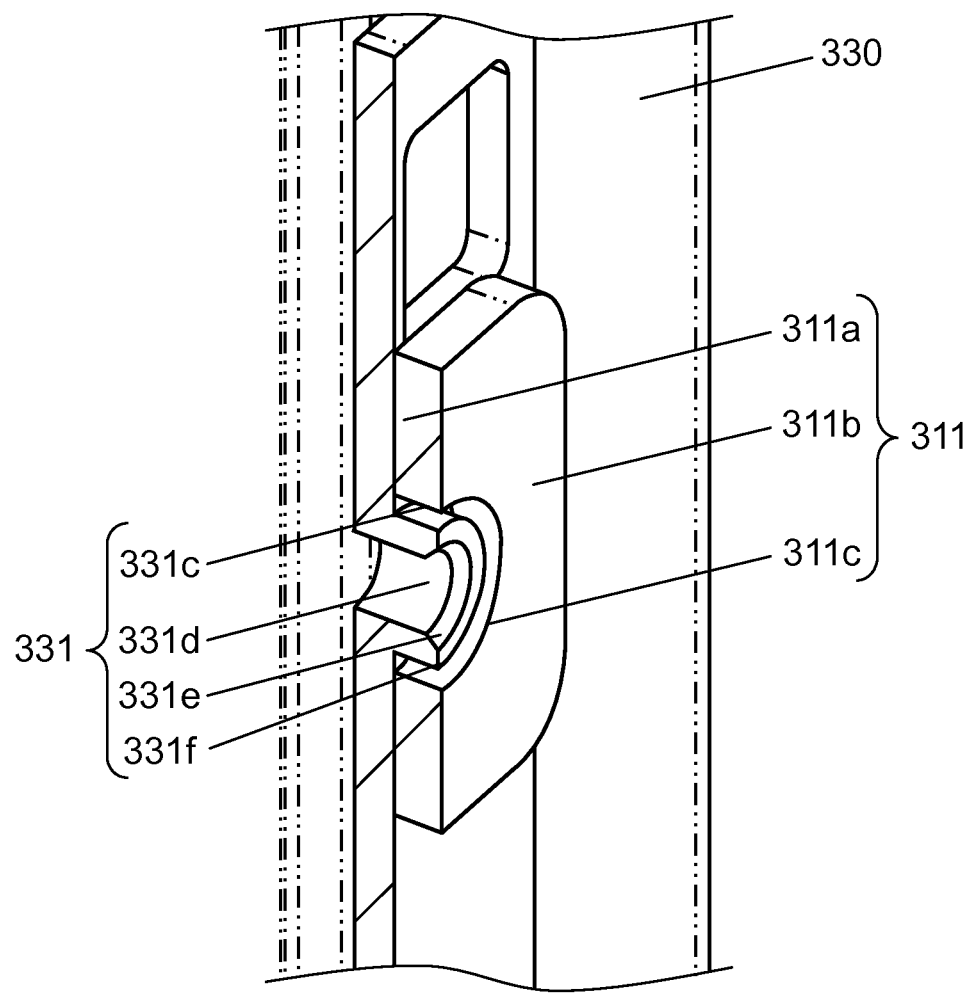
FIG. 10 is a partially enlarged view of region C of FIG. 9.
Figure 11:
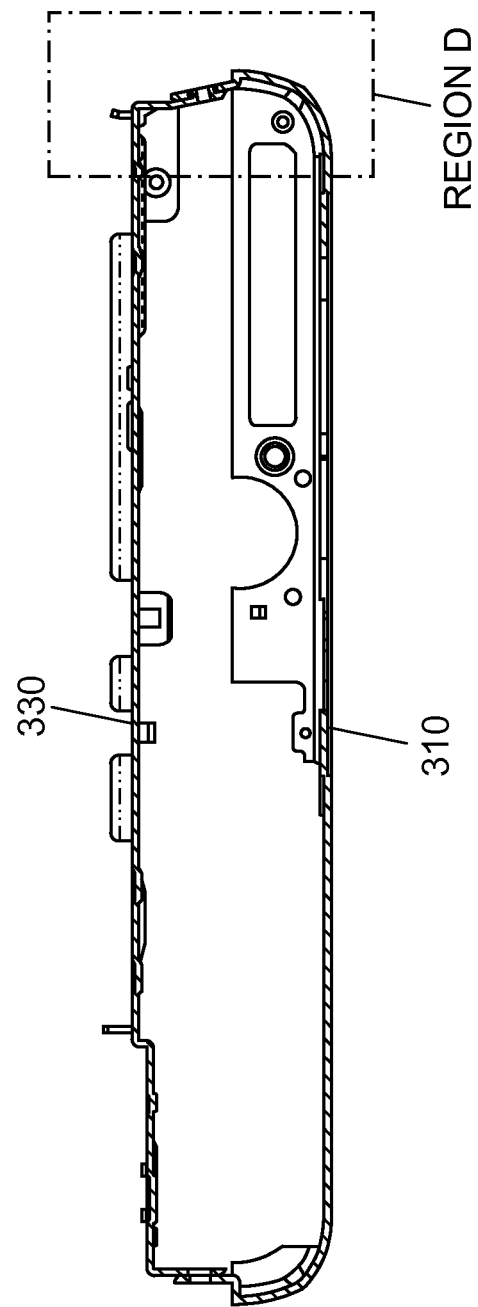
FIG. 11 is a sectional view taken along line 11-11 of FIG. 7.
Figure 12:
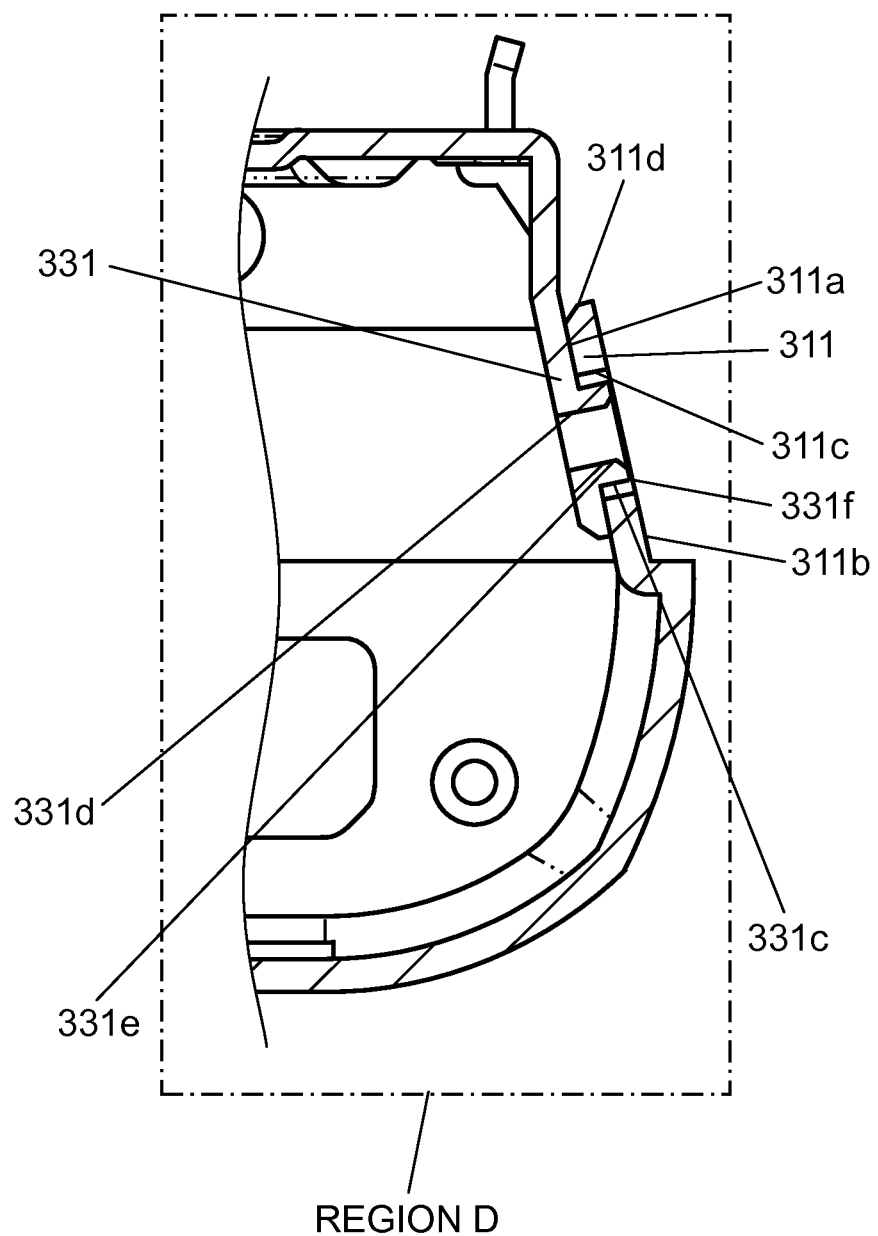
FIG. 12 is a partially enlarged view of region D of FIG. 11.

Details of configurations of front case 310 and plate 330 will be described with reference to FIGS. 7 to 12. FIG. 7 is a perspective view illustrating a relationship between front case 310 and plate 330. In FIG. 7, two components, that is, front case 310 and plate 330 are assembled. FIG. 8 is a partially enlarged view of region B of FIG. 7. FIG. 9 is a partial sectional view of FIG. 7. FIG. 9 is a sectional view illustrating front case 310 cut away in the rear side oblique direction from a vicinity of a center of front case 310. FIG. 10 is a partially enlarged view of region C of FIG. 9. FIG. 11 is a sectional view taken along line 11-11 of FIG. 7. FIG. 12 is a partially enlarged view of region D of FIG. 11.

As illustrated in FIGS. 7 and 8, front case 310 is assembled to plate 330 from outside of plate 330.

As illustrated in FIGS. 9 and 10, burring tap 331 is formed on plate 330 in a manner to face outward with respect to an internal space formed by plate 330 and front case 310. Thread face 331$d$ is formed on an inner side of burring tap 331. A screw thread with which screw 210 can be screwed is formed on thread face 331$d$. In FIGS. 9 and 10, the screw thread is not illustrated for convenience. Burring tap 331 includes side face 331$c$, tapered face 331$e$, and top face 331$f$ in addition to thread face 331$d$. Tapered face 331$e$ is formed for guiding screw 210 to thread face 331$d$.

On the other hand, as illustrated in FIGS. 9 and 10, hole part 311 is formed on front case 310 in a manner to project toward the rear side. Hole 311 includes bottom face 311$a$, top face 311$b$, and inner side face 311$c$. An inner diameter of a hole defined by inner side face 311$c$ is larger than an outer diameter of burring tap 331 defined by side face 331$c$. Bottom face 311$a$ of hole part 311 is arranged at a position that has contact with an outer peripheral face of plate 330.

As illustrated in FIGS. 11 and 12, hole part 311 has taper 311$d$ which is formed on a rear side end as well as a side corresponding to bottom face 311$a$. Taper 311$d$ is formed to allow hole part 311 to easily climb over burring tap 331 when burring tap 331 is inserted into hole part 311.

In addition, an axis of the hole of hole part 311 is inclined toward the rear side. Similarly, an axis of the hole of burring tap 331 is inclined toward the rear side. Accordingly, when plate 330 and front case 310 receive force to separate from each other, bottom face 311$a$ and the outer peripheral face of plate 330 are pressed against each other to generate a stronger frictional force. Further, side face 331$c$ and inner side face 311$c$ abut against each other. As a result, plate 330 and front case 310 are not easily detached from each other.

[4. Effects and the Like]

Figure 13:
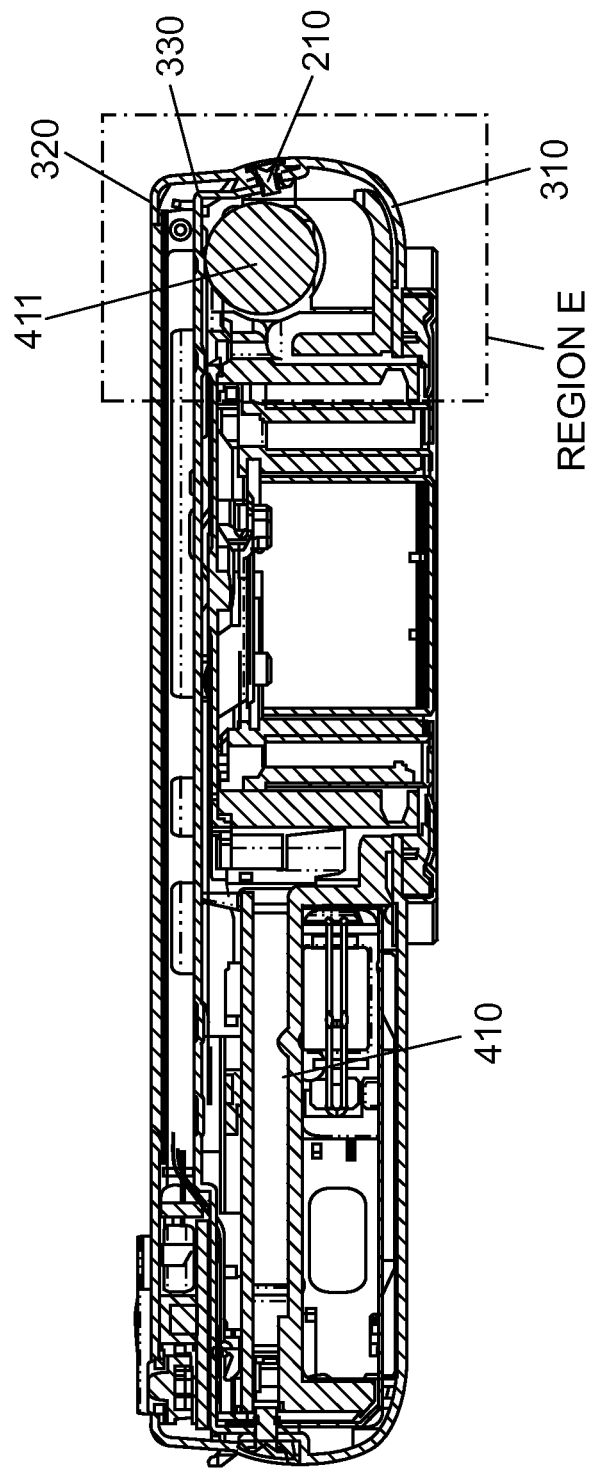
FIG. 13 is a sectional view taken along line 13-13 of FIG. 1.
Figure 14:
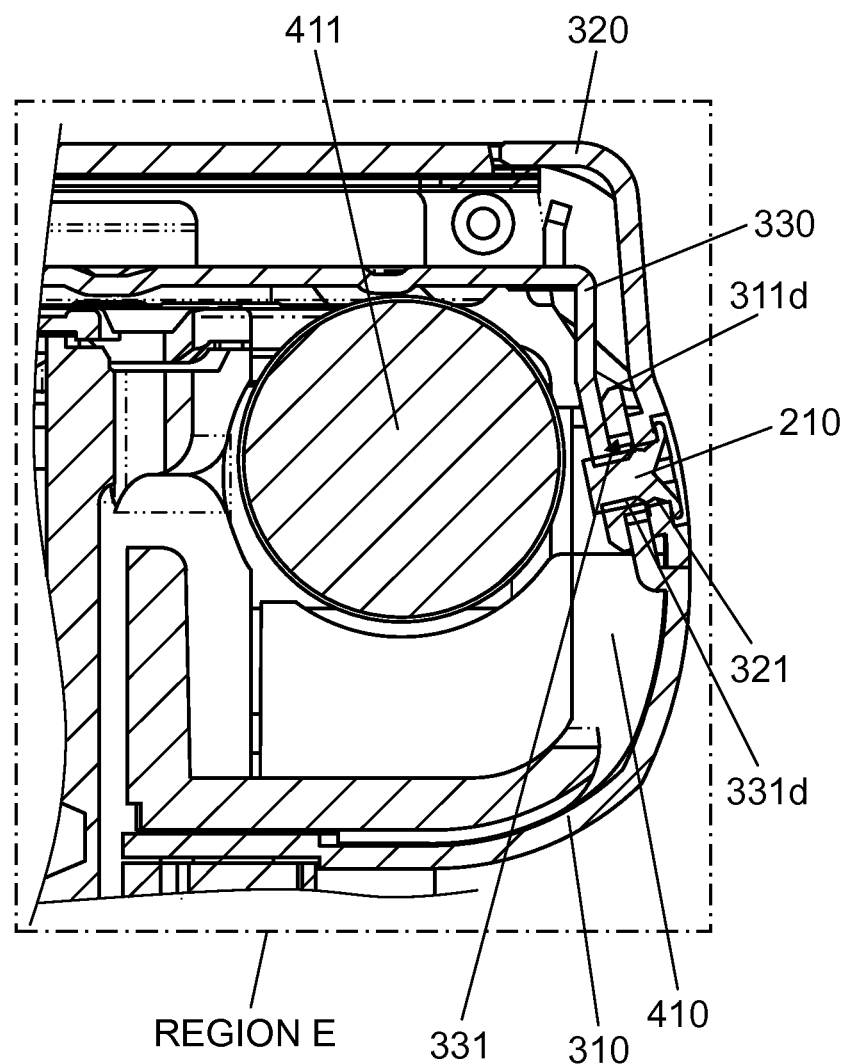
FIG. 14 is a partially enlarged view of region E of FIG. 13.
Figure 15:
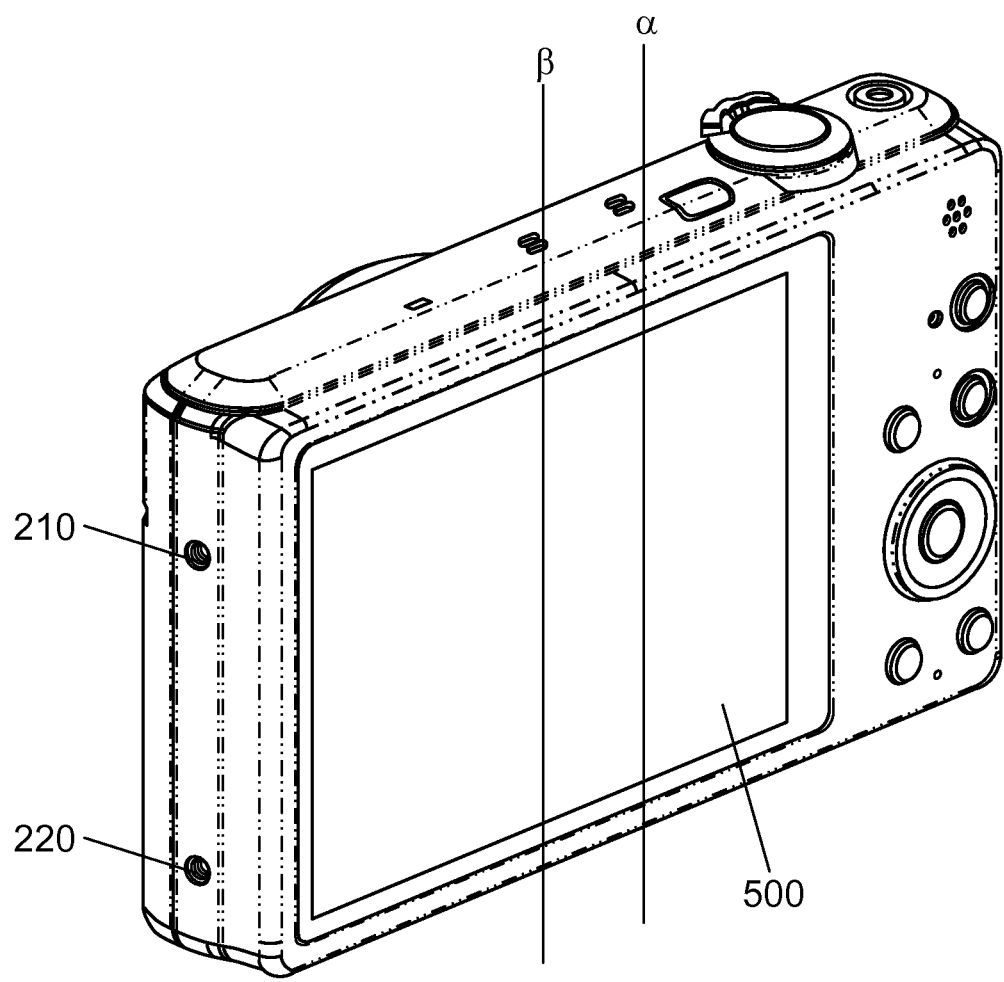
FIG. 15 is a perspective view illustrating the digital camera viewed from the rear side oblique direction.
Figure 16:
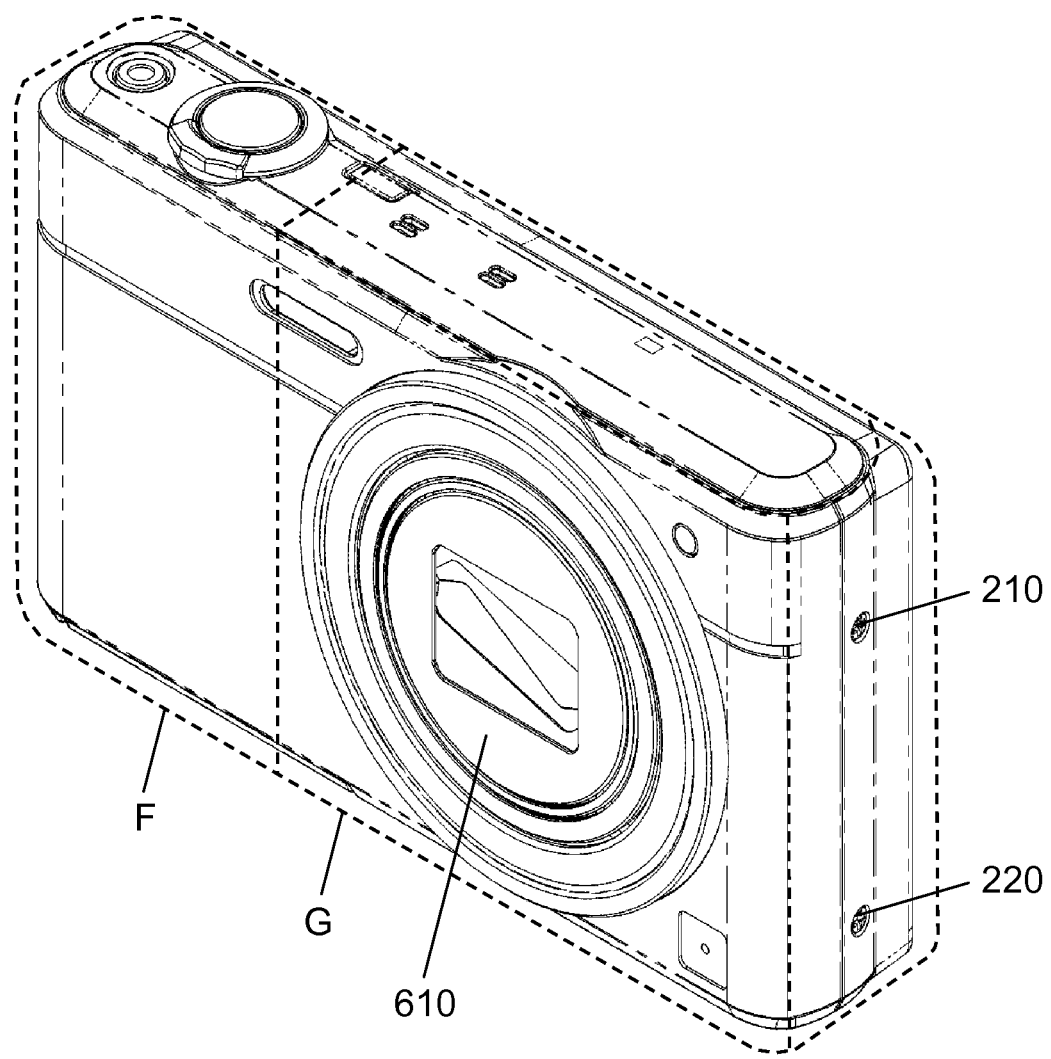
FIG. 16 is a perspective view illustrating the digital camera viewed from the front side oblique direction.

Hereinbelow, effects and the like obtained by applying the technique of the present disclosure to digital camera 100 will be described with reference to FIGS. 13 to 16. FIG. 13 is a sectional view taken along line 13-13 of FIG. 1. FIG. 14 is a partially enlarged view of region E of FIG. 13. FIG. 15 is a perspective view illustrating the digital camera viewed from the rear side oblique direction. FIG. 16 is a perspective view illustrating the digital camera viewed from the front side oblique direction.

As illustrated in FIGS. 13 and 14, digital camera 100 of the present disclosure includes main body component 410, plate 330, front case 310, and screw 210. Main body component 410 is stored inside digital camera 100. Plate 330 has tubular burring tap 331 which projects outward with respect to main body component 410 when plate 330 is arranged outside main body component 410. Hole part 311 whose diameter is larger than the outer diameter of burring tap 331 is formed on front case 310. Burring tap 331 is inserted into hole part 311. Screw 210 is attached to burring tap 331 from outside of front case 310 with burring tap 331 inserted into hole part 311. Capacitor 411 which is a part of main body component 410 is located on the axis of burring tap 331.

Accordingly, digital camera 100 of the present disclosure enables plate 330 and main body component 410 to be arranged at positions relatively close to each other. In an example illustrated in FIGS. 13 and 14, in particular, capacitor 411 of main body component 410 and plate 330 can be arranged at positions relatively close to each other. Capacitor 411 can be regarded as being located on the axis of the hole formed on burring tap 331. In digital camera 100 of the present disclosure, front case 310 and plate 330 can be temporarily fixed with main body component 410 interposed between front case 310 and plate 330 by inserting burring tap 331 into hole part 311 in the middle of assembly. As a result, digital camera 100 of the present disclosure enables the operability of assembly to be improved.

Next, a reason why plate 330 and main body component 410 can be arranged at positions relatively close to each other will be described. If a burring tap formed on plate 330 projects inward with respect to main body component 410, plate 330 and main body component 410 are arranged at positions away from each other at least by a length of the burring tap of plate 330. As a result, a size of the entire device increases. On the other hand, in digital camera 100 of the present disclosure, tubular burring tap 331 projects outward with respect to main body component 410. Burring tap 331 projecting outward is arranged inside the hole defined by inner side face 311c. That is, a length in a projecting direction of burring tap 331 fits within a thickness of front case 310. Thus, plate 330 and main body component 410 can be arranged at positions relatively close to each other without too much increasing a thickness of a casing.

More specifically, as illustrated in FIGS. 13 and 14, in digital camera 100 of the present disclosure, screw 210 is attached to the hole formed on burring tap 331, and capacitor 411 which is a part of main body component 410 is located on the axis of the hole formed on burring tap 331.

Accordingly, digital camera 100 of the present disclosure enables plate 330 and main body component 410 to be arranged at positions relatively close to each other and enables plate 330 and main body component 410 to be relatively firmly fixed to each other.

Next, a reason why plate 330 and main body component 410 can be arranged at positions relatively close to each other and plate 330 and main body component 410 can be relatively firmly fixed to each other will be described. If a burring tap formed on plate 330 projects inward with respect to main body component 410, a screw thread required for fastening screw 210 is formed inward. In order to sufficiently fasten front case 310 and plate 330 with screw 210, it is necessary to ensure a sufficient screw thread. In order to ensure a sufficient screw thread, it is necessary to ensure a relatively long length of a burring tap. As a result, the burring tap is elongated, and the size of the entire device increases. On the other hand, in digital camera 100 of the present disclosure, burring tap 331 having the hole projects outward with respect to main body component 410. Further, burring tap 331 projecting outward is arranged inside the hole defined by inner side face 311c. Thus, even when a relatively long length of the burring tap is ensured, front case 310 and plate 330 can be sufficiently fastened with screw 210 without too much increasing the thickness of the casing.

More specifically, as illustrated in FIGS. 13 and 14, digital camera 100 of the present disclosure includes front case 310 and rear case 320. Front case 310 and rear case 320 each have holes for attachment to burring tap 331 with screw 210.

Accordingly, plate 330 can be temporarily fixed by front case 310 until screw 210 is screwed after plate 330 is assembled to front case 310 during assembly of digital camera 100 of the present disclosure.

More specifically, as illustrated in FIG. 14, in digital camera 100 of the present disclosure, the end of plate 330 and the end of front case 310 face each other. Taper 311d is formed on an inner side of the end of front case 310. Taper 311d of front case 310 climbs over burring tap 331 of plate 330 by moving front case 310 from the front side to the rear side. Accordingly, burring tap 331 is inserted with clearance into the hole of front case 310.

This configuration enables hole part 311 of front case 310 to easily climb over burring tap 331 of plate 330 by taper 311d when hole part 311 is locked to burring tap 331. Therefore, plate 330 can be easily assembled to front case 310.

More specifically, as illustrated in FIG. 10, in digital camera 100 of the present disclosure, tapered face 331e is formed around the hole formed on burring tap 331 to guide screw 210 to the inside of the hole.

Accordingly, screw 210 can be easily inserted into the hole formed on burring tap 331 during assembly of digital camera 100.

More specifically, as illustrated in FIG. 15, digital camera 100 of the present disclosure further includes monitor 500 which displays an image. Monitor 500 is arranged in such a manner that, in one face of digital camera 100, a center of monitor 500 (13 illustrated in FIG. 15) is located at a position deviated from a center of the face (a illustrated in FIG. 15) in one direction (leftward in an example of FIG. 15). Burring tap 331 is disposed on plate 330 at a position deviated from a center of plate 330 in the same direction as the deviated direction of monitor 500 (leftward in the example of FIG. 15).

Accordingly, temporary fixing between front case 310 and plate 330 can be performed by burring tap 331 near a position on plate 330 at which monitor 500 which requires positioning accuracy is arranged. As a result, digital camera 100 enables the positioning accuracy for monitor 500 to be improved.

More specifically, as illustrated in FIG. 16, in digital camera 100 of the present disclosure, the entire case including front case 310 and rear case 320 forms first space G in which lens barrel 610 including an optical system which images a subject is arranged and second space F in which a lithium ion battery which supplies power for driving digital camera 100 is arranged. Burring tap 331 of plate 330 is disposed in a part that is arranged closer to the first space than the second space when plate 330 is embedded in the entire case including front case 310 and rear case 320.

Accordingly, temporary fixing between front case 310 and plate 330 can be performed by burring tap 331 near a position on plate 330 at which lens barrel 610 which requires positioning accuracy is arranged. As a result, digital camera 100 enables the positioning accuracy for lens barrel 610 to be improved.

Other Exemplary Embodiments

The first exemplary embodiment has been described as above as an example of the technique disclosed in the present application. However, the technique in the present disclosure is not limited to the first exemplary embodiment, but also applicable to exemplary embodiments on which modifications, substitutions, additions, and omissions are appropriately performed.

Hereinbelow, other exemplary embodiments will be described as examples.

In the first exemplary embodiment, burring tap 331 and burring tap 332 on each of which a hole is formed have been described as an example of the fastening part. However, the present disclosure is not necessarily limited to such a configuration. For example, the fastening part may be a projection without a hole. Accordingly, it is possible to save processing time for forming a hole on the fastening part. In this case, a cap which covers the projection may be used instead of screw 210 and screw 220. Alternatively, the rigidity of plate 330 may be merely used to prevent plate 330 and front case 310 from being detached from each other without using screw 210 and screw 220. In short, the fastening part is simply required to project outward with respect to main body component 410 when plate 330 is arranged outside main body component 410.

In the first exemplary embodiment, burring tap 331 and burring tap 332 are arranged near a right end of plate 330 when viewed from the front side of digital camera 100. However, the present disclosure is not necessarily limited to such a configuration. For example, burring tap 331 and burring tap 332 may be arranged at positions deviated in the same direction as the deviated direction of monitor 500 near an upper end or a lower end of plate 330 when viewed from the front side of digital camera 100. This configuration enables a length in the horizontal direction of digital camera 100 to be further reduced. In this case, hole part 311, hole part 312, hole part 321, and hole part 322 are also arranged at positions deviated in the same direction as the deviated direction of monitor 500 near the upper end or the lower end of plate 330 when viewed from the front side of digital camera 100. In short, the burring tap is simply required to be arranged on plate 330 at a position deviated from the center of plate 330 in the same direction as the deviated direction of monitor 500.

In the first exemplary embodiment, the configuration in which burring tap 331 formed on plate 330 is inserted into hole part 311 formed on front case 310 has been described as an example. However, the present disclosure is not necessarily limited to such a configuration. For example, burring tap 331 formed on plate 330 may be inserted into a hole part formed on a rear case. In this case, a front case is arranged outside the rear case. Further, a screw is screwed from outside of the front case.

In the first exemplary embodiment, burring tap 331 is formed outward with respect to main body component 410. However, the present disclosure is not necessarily limited to such a configuration. For example, a restriction member which restricts inward movement of plate 330 may be provided. When screw 210 is screwed from the outside, burring tap 331 may be pressed inward to change a shape of plate 330. The restriction member enables the possibility of such shape change in plate 330 to be reduced.

The exemplary embodiments have been described as above as examples of the technique in the present disclosure. For this, the accompanying drawings and detailed description have been provided.

Thus, the elements described in the accompanying drawings and the detailed description may include not only essential elements for solving the problems, but also non-essential elements for solving the problems in order to illustrate the technique. Therefore, the mere fact that those non-essential elements are shown in the accompanying drawings or the detailed description should not be interpreted as requiring that such non-essential elements be essential.

Since the exemplary embodiments described above are intended to illustrate the technique in the present disclosure, various modifications, substitutions, additions, and omissions may be made within the scope of the claims or equivalents thereof.

The present disclosure is applicable to, for example, digital still cameras, mirrorless cameras, single lens reflex cameras, and smartphones.

The invention claimed is:

1. An imaging device comprising:
an electronic member;
a plate having a fastening part, the fastening part having a tubular shaped flange projecting outward with respect to the electronic member when the plate is arranged outside the electronic member, the tubular shaped flange of the fastening part being formed from metal and having threads on an inside surface thereby forming a burring tap;
a case having a hole whose diameter is larger than an outer diameter of the fastening part, the tubular shaped flange of the fastening part being inserted and extending into the hole; and
a fastening member attached to the fastening part from outside of the case with the fastening part inserted into the hole;
wherein
the case forms a first space in which a lens barrel including an optical system that images a subject is arranged and a second space in which a power source that supplies power for driving the electronic device is arranged.

2. The imaging device according to claim 1, wherein
the fastening member is attached to a hole formed on the fastening part, and
the part of the electronic member is located on an axis of the hole formed on the fastening part.

3. The imaging device according to claim 2, wherein a taper is formed around the hole formed on the fastening part to guide the fastening member to inside of the hole.

4. The imaging device according to claim 1, wherein
the case includes a front case and a rear case, and
the front case and the rear case each have holes for attachment to the fastening part with the fastening member.

5. The imaging device according to claim 1, wherein
an end of the plate and an end of the case face each other,
a taper is formed on an inner side of the end of the case, and
the taper of the case climbs over the fastening part of the plate to fit the hole of the case with the fastening part.

6. The imaging device according to claim 1, further comprising a monitor that displays an image, the monitor being arranged in such a manner that, in one face of the electronic device, a center of the monitor is located at a position deviated from a center of the one face in one direction,
  wherein the fastening part is formed on the plate at a position deviated from a center of the plate in the same direction as the one direction.

7. The imaging device according to claim 1, wherein the fastening part of the plate is located in a part that is arranged closer to the first space than the second space when the plate is embedded in the case.

8. The imaging device according to claim 1, wherein a part of the electronic member is located on an axis of the fastening part.

9. An imaging device:
  an electronic member;
  a plate having a fastening part, the fastening part having a tubular shaped flange projecting inward with respect to the electronic member when the plate is arranged outside the electronic member, the tubular shaped flange of the fastening part being formed from metal and having threads on an inside surface thereby forming a burring tap;
  a case having a hole whose diameter is larger than an outer diameter of the fastening part, the tubular shaped flange of the fastening part being inserted and extending into the hole; and a fastening member attached to the fastening part from outside of the plate with the fastening part inserted into the hole;
  wherein
  the case forms a first space in which a lens barrel including an optical system that images a subject is arranged and a second space in which a power source that supplies power for driving the electronic device is arranged.

10. The imaging device according to claim 9, wherein a part of the electronic member is located on an axis of the fastening part.

* * * * *